Figure 1:
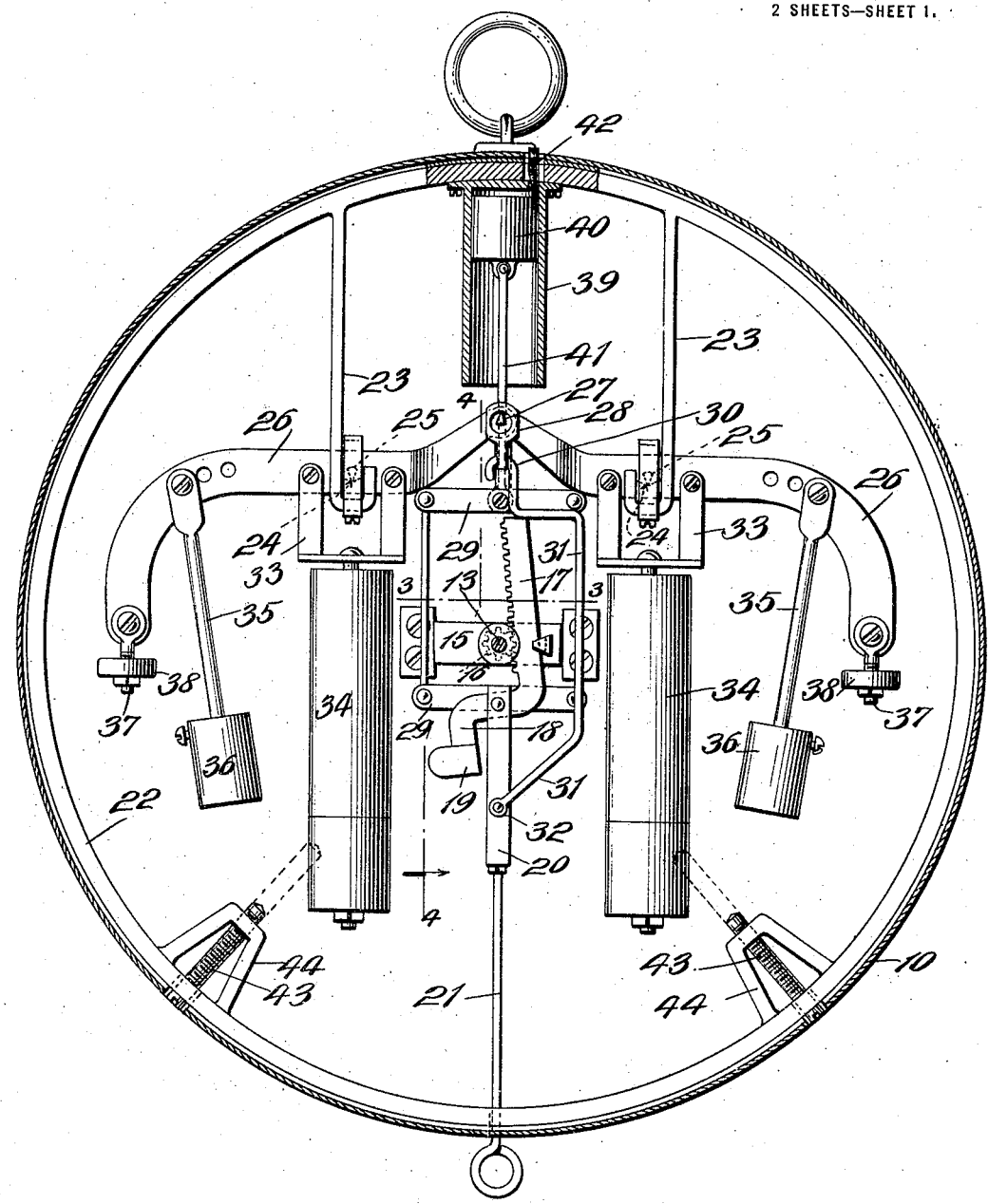

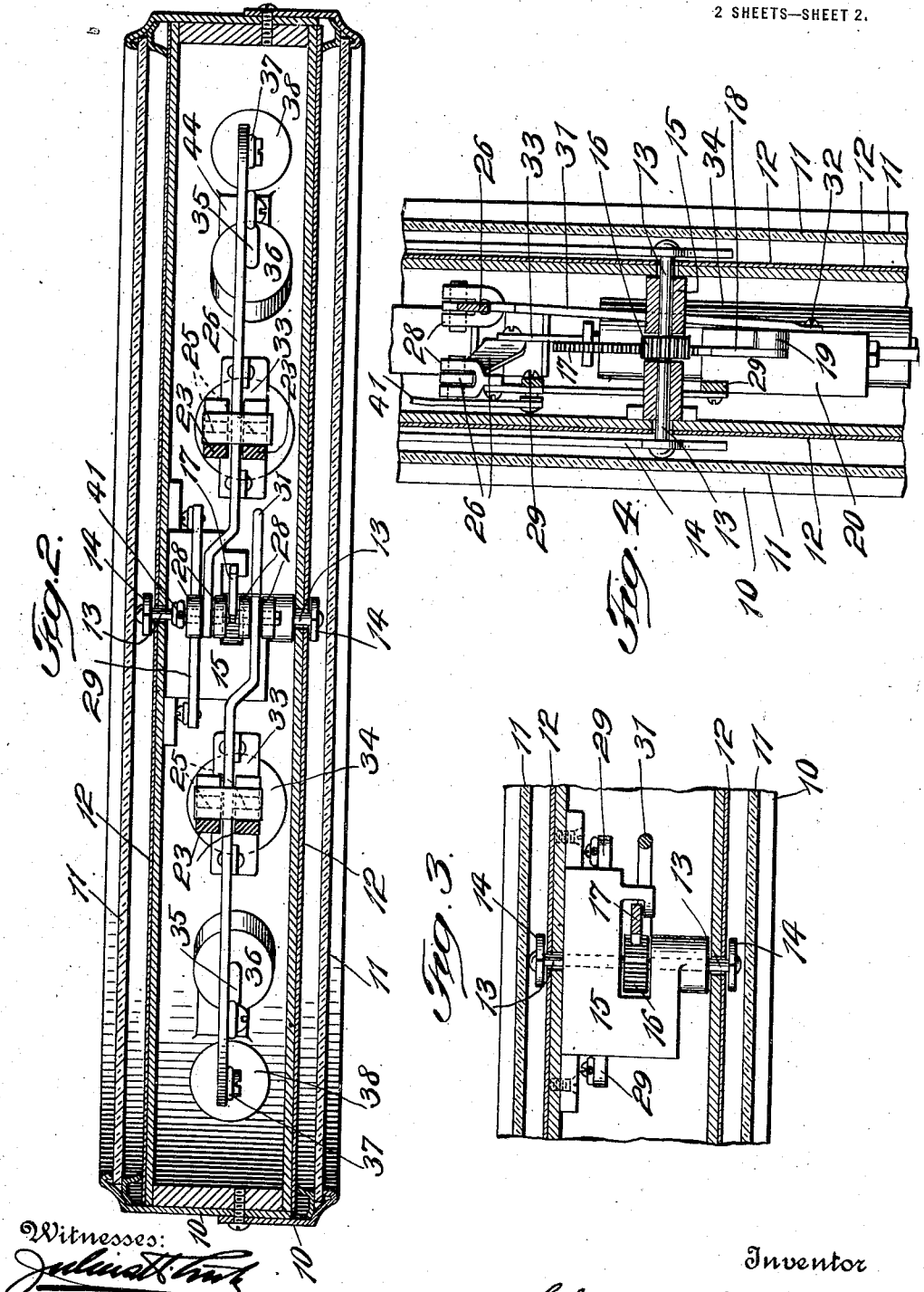

UNITED STATES PATENT OFFICE.

CHARLES SIRCH, OF NEW YORK, N. Y.

WEIGHING-SCALE.

1,145,928.  Specification of Letters Patent.  Patented July 13, 1915.

Application filed August 10, 1914. Serial No. 855,974.

*To all whom it may concern:*

Be it known that I, CHARLES SIRCH, a citizen of the United States, and a resident of New York city, county and State of New York, have invented a certain new and Improved Weighing-Scale, of which the following is a specification.

This invention relates to a weighing scale, of the class in which a rotating pointer indicates the weight to be ascertained upon a dial. By my invention all springs with which this class of scales was usually provided are omitted, and an accurate working and delicate adjustment are assured.

In the accompanying drawing: Figure 1 is a face view of a scale embodying my invention, with the dial and pointer omitted; Fig. 2 a horizontal section of the scale; Fig. 3 a section on line 3—3 Fig. 1; and Fig. 4 a vertical section on line 4—4, Fig. 1.

The casing 10 of the scale is of circular form, and with the embodiment shown is provided with windows 11, and dials 12 on both of its sides, though the invention may of course be also applied to single face scales.

The arbor 13 carrying the pointers 14, is journaled in a bearing 15 and carries a pinion 16. This pinion is engaged by a rack 17, having a bent heel 18, which is counterweighted at 19. From heel 18 depends a bar or hanger 20, into which is screwed an eyed wire 21, to which a scale pan or hook (not shown) is adapted to be coupled.

Within casing 10 is mounted a circular frame 22 from which depend a pair of bars 23 each carrying a V shaped bearing 24. Each bearing 24, is engaged by a knife-edge fulcrum 25, of a balance beam 26, the two beams 26 being alike in all respects, and extending outwardly in opposite directions from the center of the scale, where they are operatively connected to bar 20, and consequently to the load in the following manner: Each beam 26 is furnished at its inner end with a knife edge fulcrum 27 that engages a forked apertured link 28, constituting a bearing. One of the links 28, is pivoted to the upper arm of a yoke or square frame 29, the lower arm of which is rigidly secured to bar 20. The second link 28, is engaged by a hook 30, the bent shank 31 of which is pivoted to bar 20, at 32, some distance below yoke 29. By means of the independent connections described, the two beams 26 will have a free and independent movement imparted to them by the load, so that any binding is effectively prevented.

The knife edge 25 of each beam 26 is encompassed by a yoke 33, to which is rigidly attached a comparatively heavy load-counterbalancing weight 34, which is axially alined with the knife edge and normally sustains the beam in a substantially horizontal position. At a distance beyond weight 34, there depends from beam 26, a rod 35, carrying a lighter adjustable weight 36, which may be set whenever the pointer does not truly indicate the zero mark. At its extreme outer end there depends from beam 26, a pivoted screw 37, that is engaged by a still lighter adjustable weight 38, which permits the device to be set, to differently heavy pans, hooks, etc., suspended from wire 21.

If desired the scale may be provided with a cylinder 39, depending from the top of frame 22, and furnished with a piston 40, which is by link 41 connected to hanger 20. The upper air chamber of the piston, has a port, the size of which may be adjusted by means of a beveled screw plug 42, the device thus operating in the manner of a dash pot.

In order to prevent weights 34 from moving when the scale is carried about, they are adapted to be engaged by set screws 43 journaled in bearings 44 that extend inwardly from frame 22.

I claim:

1. A weighing scale comprising a pair of fixed bearings, a pair of oppositely extending beams directly supported thereon and having knife-edge fulcrums at their inner ends, weights suspended from the beams axially below the bearings, a load-sustaining hanger, a rack pivoted thereto, a pinion engaged by the rack, a pointer operable by the pinion, apertured links engaging the knife-edge fulcrums, and independent means for securing the links to the hanger.

2. A weighing scale comprising a pair of fixed bearings, a pair of oppositely extending beams directly supported thereon, yokes secured to the beams and straddling the bearings, weights depending from the yokes, a load sustaining hanger, a pointer operable thereby, and independent means for securing the inner ends of the beams to the hanger.

3. A weighing scale comprising a frame, a pair of bars depending therefrom, a pair of fixed bearings carried by the bars, a pair of oppositely extending beams directly supported by the bearings, yokes secured to the beams and straddling the bearings, weights depending from the yokes, a load-sustaining hanger, a pointer operable thereby, and independent means for securing the inner ends of the beams to the hanger.

CHARLES SIRCH.

Witnesses:
FRANK V. BRIESEN,
MADELINE HIRSCH.

Copies of this patent may be obtained for five cents each, by addressing the "Commissioner of Patents, Washington, D. C."